United States Patent [19]

Baxansky et al.

[11] 4,211,916
[45] Jul. 8, 1980

[54] DEVICE FOR DIAGNOSING MICROPROGRAM COMPUTERS

[76] Inventors: Mark I. Baxansky, ulitsa Dekabristov, 127, kv. 222; Valery F. Gusev, ulitsa Karbysheva, 13a, kv. 35; Genrikh I. Krengel, ulitsa Ibragimova, 45, kv. 49; Viktor P. Mikhailov, ulitsa Kosmonavtov, 22, kv. 50; Ravil S. Kuramshin, ulitsa Soldatskaya, 7, kv. 1; German P. Sorokin, ulitsa Chernyshevskogo, 24/23, kv. 12; Azat U. Yarmukhametov, ulitsa Adelya Kutuya, 12, kv. 23, all of Kazan, U.S.S.R.

[21] Appl. No.: 860,309

[22] Filed: Dec. 14, 1977

[30] Foreign Application Priority Data

Dec. 16, 1976 [SU] U.S.S.R. ............................ 2428151[I]

[51] Int. Cl.² .......................................... G06F 11/04
[52] U.S. Cl. ........................................ 371/15; 364/200
[58] Field of Search ........................ 235/304, 304.1; 364/200, 900

[56] References Cited

U.S. PATENT DOCUMENTS

| | | | |
|---|---|---|---|
| 3,831,148 | 8/1974 | Greenwald et al. | 235/304.1 |
| 3,909,802 | 9/1975 | Cassarino, Jr. et al. | 235/304.1 |
| 3,916,178 | 10/1975 | Greenwald | 235/304.1 |
| 3,935,717 | 4/1976 | Rottier et al. | 235/304.1 |
| 4,048,481 | 9/1977 | Bailey et al. | 235/304.1 |

OTHER PUBLICATIONS

T. F. Storey, Design of Microprogram Control for a Processor in an Electronic Switching System, The Bell System Technical Journal, vol. 55, No. 2, 182-232, Feb. 1976.

*Primary Examiner*—Charles E. Atkinson
*Attorney, Agent, or Firm*—Lackenbach, Lilling & Siegel

[57] ABSTRACT

The method for diagnosing microprogrammed computers consists of locating malfunctioning computer circuits with the aid of basic control data from which individual basic control words are selected under the control of diagnostic control data, and activating those basic microorders contained in the selected basic control words which provide for execution of a predetermined diagnostic procedure. A device for effecting the above method comprises two groups of NAND gates, as well as two flip-flops. The first inputs of the NAND gates of each group are connected to respective outputs of a diagnostic control data storage and the second inputs are connected to the output of the flip-flop whose input is coupled to the output of a diagnostic unit. The outputs of the NAND gates of the first group are connected to the inputs of the control unit of a basic control data storage. The outputs of the NAND gates of the second group are connected via NOR gates to the activate inputs of respective decoders. Connected to other inputs of the NOR gates is the output of the flip-flop whose first and second inputs are connected, respectively, to the control unit associated with the first decoders and to the diagnostic unit.

1 Claim, 5 Drawing Figures

4,211,916

DEVICE FOR DIAGNOSING MICROPROGRAM COMPUTERS

FIELD OF THE INVENTION

The present invention relates to computer engineering and, more particularly, to organization of diagnostic systems for microprocesser computers, specifically, to methods and devices for diagnosing computers.

The invention can be most advantageously used in special-purpose and general purpose computers, and in automatic control and other data processing systems.

DESCRIPTION OF THE PRIOR ART

There are methods known for diagnosing microprogrammed computers having a basic control data file, which locate malfunctioning computer circuits with the aid of diagnostic control data.

These methods presuppose the presence of a diagnostic control data file. The control words (microinstructions) of this file must have bits for microorders to control diagnostic facilities, as well as bits intended for microorders to control facilities for processing data required for diagnostics.

Since diagnosis of computers involves stage-by-stage checking of circuits, the number of microorders controlling the data processing facilities and executed within a machine cycle is always less in diagnostics than in data processing. Therefore, most bits of a diagnostic microinstruction contain no data whatsoever, which results in incomplete utilization of the diagnostic microinstruction storage capacity. On the other hand, enhancing the efficiency of diagnostics involves execution of as many data processing microorders as possible. This leads to a greater number of bits to accommodate these microorders, which increases the length of a control word and consequently the diagnostic data storage space.

Also known are devices for diagnosing computers by using the above methods which comprise a basic control data storage with its' input and an output connected to its control unit. Other outputs of this data storage are connected to the data inputs of basic decoders, the number of which is equal in number to the number of basic microorders executed within a machine cycle. The basic decoder is also connected to another control unit. This control unit is coupled, in turn, to the basic control data storage control unit and to a computer data processing unit. The processing unit is connected to a control unit associated with the basic decoders and to a check unit. The check unit has a second insert coupled to the basic control data storage and an output and a third input connected to a third control unit. The third control unit has its input and output connected to a diagnostic control data storage The diagnostic control data storage has its outputs coupled to additional decoders, the number of which is equal in number to the diagnostic microorders executed within a diagnostic unit operation cycle, the additional decoders being coupled to said diagnostic unit.

The device for effecting the above-described method has two units for storing control data. The first unit is intended for storage of the basic control data (data processing microprograms) and diagnostic control data (diagnostic microprograms), while the second unit stores only diagnostic control data. Control words from both storages are selected for the same microinstruction register. Both storages have a common address register controlled by an initial selection flip-flop. Microinstructions of both types have the same bit length. Thus, the second storage is essentially an extention of the first one, although they are physically separated. The total control data storage space is, therefore, rather large, having areas which are not used for storing information, as well as areas which are not fully utilized.

SUMMARY OF THE INVENTION

It is an object of the present invention to provide a method for diagnosing computers which substantially reduces the space occupied by the diagnostic control data file.

Another object of the invention is to provide a device for diagnosing computers by the above method providing for use of basic control data and diagnostic control data files, minimizing the control data storage space and ensuring fuller utilization of this space.

Still another object of the invention is to enable creation of various combinations of diagnostic tests, with a view to substantially extend the functional capabilities of the device.

With these and other objects in view, the invention is a method for diagnosing microprogrammed computers having a basic control data file, consisting of locating malfunctioning computer circuits with the aid of diagnostic control data. According to the invention, individual basic control words are selected from the basic control data under the control of the diagnostic control data, and those basic microorders contained in the selected basic control words are activated which provide for execution of a predetermined diagnostic procedure.

The invention also includes in a device for diagnosing microprogrammed computers by the above method, comprising a basic control data storage whose input and first output are connected to its control unit and whose other outputs are connected to data inputs of first decoders, the number of which is to the number of the basic microorders executed within a computer cycle. The decoders are connected to another control unit. This second control unit is coupled, in turn, to the control unit of the basic control data storage and to a computer data processing unit. The processing unit is connected to the control unit coupled to the decoders and to a check unit. The check unit has another input connected to the basic control data storage and an output and another input connected to diagnostic unit. A third control unit has an input and an output coupled to a diagnostic control data storage. The outputs of the diagnostic control data storage are connected to a second group of decorders, the number of which is equal to the number of diagnostic microorders executed within an operation cycle of a diagnostic unit, the second decoders being connected to the diagnostic unit. According to the invention, first group of NAND gates have some of their inputs connected to outputs of the diagnostic control data storage and their outputs connected to the control unit of the basic control data storage. A flip-flop has an input connected to the output of the diagnostic unit and an output connected to second inputs of the NAND gates of the first group so that the address flags of an individual basic control word of the basic control data are applied from the diagnostic control storage, in the presence of an enable signal from the flip-flop output, to the control unit of the basic control data storage. A second group of NAND gates, has inputs connected to other outputs of the diagnostic control data storage and second inputs connected to the output of the flip-flop. A group of NOR gates have some of their inputs connected to the outputs of the NAND gates of the second group and their outputs connected to activate inputs of respective first decoders so that the flags of the basic microorder contained in a selected basic control word and providing for execution of a predetermined diagnostic procedure are applied via the NAND gates of the second group, in the presence of an enabling signal from the flip-flop output, and via the NOR gates to a respective first decoder, thereby activating the execution of a predetermined basic microorder. A second flip-flop has two inputs connected, respectively, to an output of the control unit associated with the first decoders and to an output of the diagnostic unit. Its output is connected to other inputs of the NOR gates so that, when a signal is applied from an output of the control unit associated with the first decoders to set the second flip-flop, the flip-flops produces a signal which passes via the NOR gates to the activate inputs of all the first decoders. The arrival of a signal from an output of the diagnostic unit resets the flip-flop, whereby all the first decoders are deactivated. One of the outputs of the diagnostic unit is connected to an input of the basic control data storage as that the signal applied from the diagnostic unit to this storage discontinues the selection of basic control words from the basic control data storage.

Such an embodiment of the proposed device for effecting the method of the invention minimizes the volume of the diagnostic control data, because only part of the basic control data is used for diagnostic purposes. At the same time, control words of the diagnostic control data contain only control flags pertaining to the basic control data, which permits compacting data in a control word. This feature, along with storage of the basic control data and diagnostic control data in separate store units, reduces the total control data storage space and increases its effective capacity.

During diagnosis, the data processing facilities are controlled by the same microorders as during data processing and with the same control circuits being used. The possibility of executing, during diagnosis, any microorder of the data processing facilities enables the formation of practically any combination of microorders to solve a variety of diagnostic problems. All this considerably extends the functional possibilities of the proposed device and simplifies it. In particular, no special checks of the control circuits are required.

BRIEF DESCRIPTION OF THE DRAWINGS

These and other objects, features and advantages of the invention will become more apparent from a detailed desciption of a preferred embodiment thereof with reference to the accompanying drawings, wherein.

DETAILED DESCRIPTION OF THE INVENTION

The proposed method for diagnosing microprogrammed computers with a basic control data file consists of locating malfunctioning computer circuits with the aid of basic control data from which individual basic command words are selected under the control of diagnostic control data, those basic microorders contained in the selected basic control words being activated which provide for execution of a predetermined diagnostic procedure.

Figure 1:
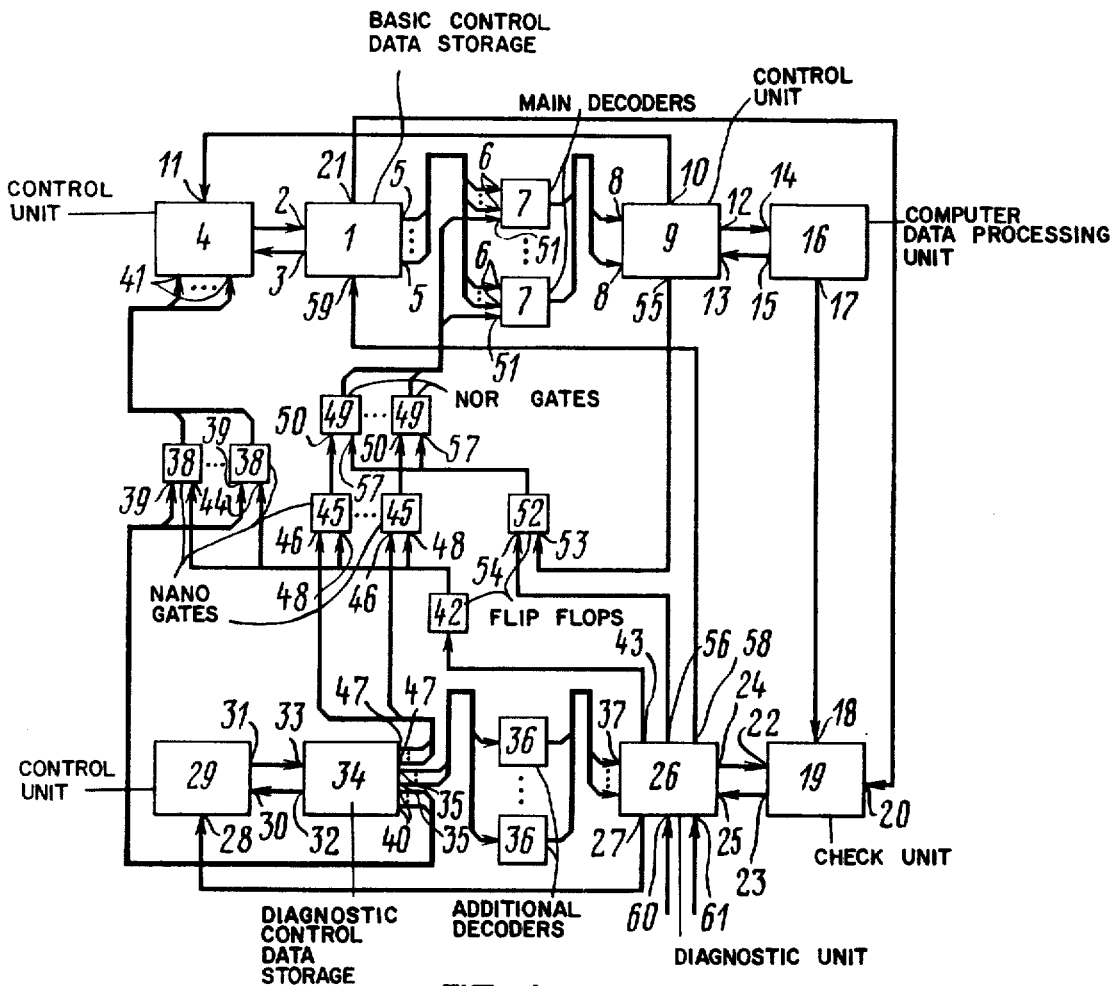
FIG. 1 is a block diagram of a device for diagnosing computers by effecting the method according to the invention.

Also proposed is a device for effecting the above method. Referring now to FIG. 1, the device comprises a basic control data storage 1, whose input 2 and output 3 are connected to its control unit 4. Outputs 5 of the basic control data storage 1 are coupled to data inputs 6 of respective main decoders 7, the number of which is equal to the number of basic microorders executed within a machine cycle. The outputs of the main decoders 7 are connected to respective inputs 8 of a control unit 9 whose output 10 is coupled, in turn, to an input 11 of the control unit 4. An output 12 and an input 13 of the control unit 9 are connected, respectively, to an input 14 and an output 15 of a computer data processing unit 16. An output 17 of the processing unit 16 is connected to an input 18 of a check unit 19. A typical check unit is disclosed by Drozdov, et al., "Computers of the Unified System" Mashinestroenie Publishers, Moscow (1976), pp. 566-7). An input 20 of the check unit 19 is coupled to an output 21 of the storage 1. An input 22 and an output 23 of the check unit 19 are connected to an output 24 and an input 25, respectively, of a diagnostic unit 26. The diagnostic unit 26 has an output 27 connected to an input 28 of a control unit 29. The control unit 29 has an input 30 and an output 31 coupled to an output 32 and an input 33, respectively, of a diagnostic control data storage 34. Outputs 35 of the diagnostic control data storage 34 are coupled to the inputs of respective additional decoders 36, the number of which is equal to the number of to the diagnostic microorders executed within a operation cycle of the diagnostic unit 26. The outputs of the decoders 36 are connected to respective inputs 37 of the diagnostic unit 26.

The device according to the invention also comprises a first group of NAND gates 38 having inputs 39 coupled to respective outputs 40 of the diagnostic control storage 34 and outputs coupled to respective inputs 41 of the control unit 4. A flip-flop 42 has an input connected to an output 43 of the diagnostic unit 26 and an output connected to inputs 44 of the NAND gates 38 so that the address flags of an individual basic control word of the basic control data are applied from the diagnostic control data storage 34, in the presence of an enable signal from the output of the flip-flop 42, to the control unit 4.

The herein-disclosed device further comprises a second group of NAND gates 45 having inputs 46 connected to respective outputs 47 of the diagnostic control data storage 34 and other inputs 48 coupled to the output of the flip-flop 42. A group of NOR gates 49 have inputs 50 connected to the outputs of respective NAND gates 45 and outputs connected to activate inputs 51 of respective main decoders 7 so that the flags of the basic microorder contained in a selected control word and providing for execution of a predetermined diagnostic procedure are applied via the NAND gates 45, in the presence of an enable signal from the output of the flip-flop 42, and via the NOR gates 49 to a respective main decoder 7, thereby activating the execution of a predetermined basic microorder.

Also included in the device is a second flip-flop 52 whose inputs 53 and 54 are connected, respectively, to an output 55 of the control unit 9 and to an output 56 of the diagnostic unit 26 and whose output is connected to other inputs 57 of the NOR gates 49 so that, when a signal is applied from the output 55 of the control unit 9 to set the flip-flop 52, the flip-flop produces a signal which passes via the NOR gates 49 to the activate inputs 51 of all the main decoders 7, while the arrival of a signal from the output 56 of the diagnostic unit 26 resets the flip-flop 52, whereby all the main decoders 7 are deactivated. An input 58 of the diagnostic unit 26 is coupled to an input 59 of the basic control data storage 1 so that the signal applied from the diagnostic unit 26 to the storage 1 discontinues the selection of basic control words from the storage 1.

The diagnostic unit 26 has another input 60 which receives a signal enabling operation of the diagnostic unit 26, following an error signal from the output 23 of the check unit 19. Otherwise, the data processing continues even in the presence of processing errors, or an error halt takes place. The diagnostic unit 26 has an additional input 61 for receiving a signal activating the diagnostic unit 26 at any moment.

The proposed method for diagnosing computers and the operating principle of the device for effecting this method are in accordance with the following principles.

Microprogrammed computers having a basic control data file are diagnosed by location of malfunctioning computer circuits with the aid of diagnostic control data. Therewith, the computer hardware can be conventionally divided into three parts: main facilities for data processing under the control of the basic control data; facilities for checking the transfer, handling and storage of data; and diagnostic facilities for locating malfunctioning computer circuits under the control of the diagnostic control data. The control data storage space is determined by the number of storage locations, which depends, in turn, on the number of bits in a control words, as well as on the number of control words. (See, Husson "MICROPROGRAMMING, Principles and Practices", Prentice-Hall, Inc., Englewood Cliffs, N.J. (1970), pp. 84–7, for a discussion of how to maximize capacity by microprogramming).

The following designations will now be introduced for further explanation of the proposed method and operating principles of the device for effecting same:

V total control data storage space;

k number of control words bits containing basic microorders;

e number of control word bits containing diagnostic microorders;

f number of basic microinstructions;

g number of diagnostic microinstructions for controlling the main facilities; and h number of diagnostic microinstructions for controlling the diagnostic facilities.

The storage space V can be defined as follows:

$$V=(e+k)(f+g+h).$$

Figure 2A:
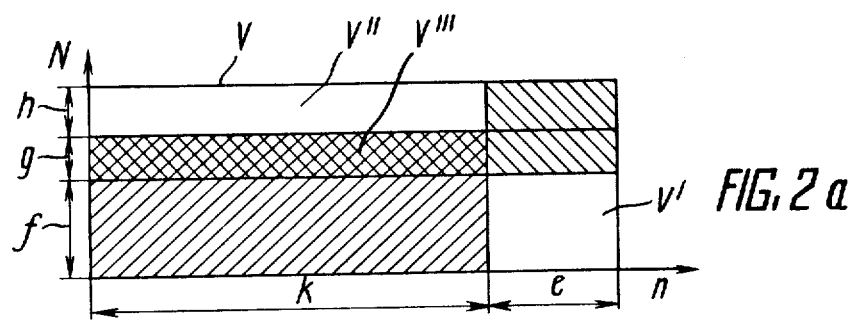
FIG. 2a, 2b, 2c, and 2d are graphs showing the distribution of the control data storage space among store units of the device according to the invention.

FIG. 2a shows the distribution of the control data storage space. Plotted on the abscissa, in conventional units, in the number n of control word bits, and plotted on the ordinate is the number N of control words. The areas shown by rightward hatching in FIGS. 2a, 2b, 2c, 2d are storage spaces accomodating the basic microorders, shown by leftward hatching are those accomodating the diagnostic microorders controlling the diagnostic facilities, and shown by cross-hatching are storage spaces accomodating the diagnostic microorders controlling the main facilities.

Selected for data processing are microorders out of the number f (FIG. 2a). As can be inferred from FIG. 2a, storage space $V'=ef$ contains no data. Selected for diagnostics are microorders out of the numbers g and h, in which case storage space $V''=kh$ does not contain any data either, while in storage space $V'''=kg$ the storage capacity is not fully utilized.

Bits k have fields equal in number to the basic microorders executed within a machine cycle. During diagnosis, the number of microorders controlling the main facilities and executed within an operation cycle of the diagnostic unit is much smaller. Therefore, most bits k in g microinstructions contain no data.

Figure 2B:
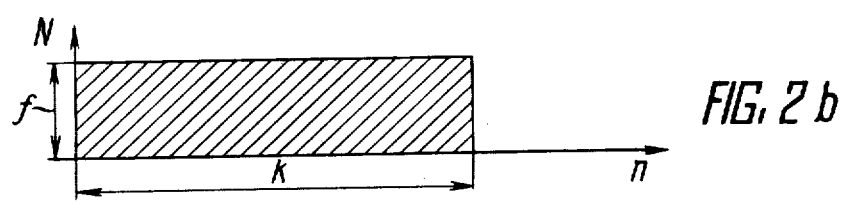
Figure 2C:
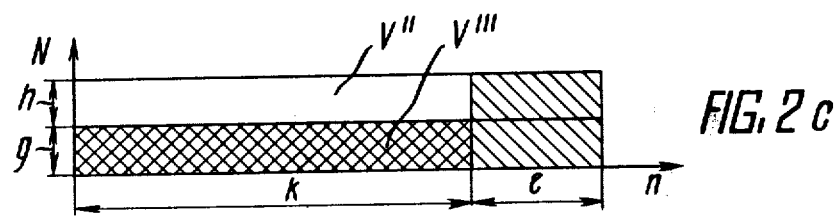

According to the invention, the basic control data and diagnostic control data are stored in separate store units. FIG. 2b represents the basic control data storage space, and FIG 2c shows the diagnostic control data storage space (using the same designations as in FIG. 2a). It can be seen that the unused storage space V' is completely excluded.

In accordance with the invention, a computer is diagnosed using a certain sequence of basic microorders which are activated in individually selected basic control words. In a diagnostic microinstruction, instead of the number k of bits (FIG. 2a), the number $k_1$ of bits s used, which is quite sufficient to accomodate the basic microinstruction flags, i.e., flags indicating the address by which a basic microinstruction should be selected and which microorders contained therein should be executed.

Let us designate:

$k_1$ number of control word bits containing basic microinstruction flags;

$e_1$ number of control word bits containing diagnostic microorders;

$g_1$ number of diagnostic microinstructions controlling the main facilities; and $h_1$ number of diagnostic microinstructions controlling the diagnostic facilities.

Figure 2D:
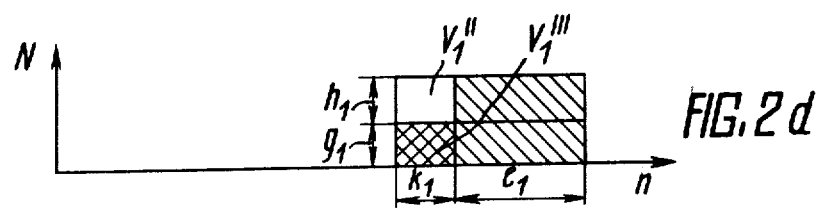

FIG 2d represents the distribution of the diagnostic control data storage space.

Here, $h_1 \sim h, g_1 \sim g, e_1 \sim e$, but $k_1 \leq k$, therefore, $$V_1''=k_1 h_1 \leq V'',$$

while storage space $V_1'''=k_1 g_1$ is more fully utilized as compared to $V'''$.

The method according to the invention permits, by specially coding the diagnostic microinstruction fields, the unused space $V_1{}^{41}$ to be completely eliminated and the number $e_1$ of bits to be reduced. This is achieved in the device for effecting the proposed method.

the device for effecting the proposed method of diagnosing microprogrammed computers with a basic control data file operates as follows:

The computer processes data under the control of the basic control data. A particular sequence of control words (basic microinstructions) of this data determines the data processing mode. Microinstructions are selected from the basic control data storage 1 (FIG. 1). All bits of a selected microinstruction are supplied from the outputs 5 to the data inputs 6 of the main decoders 7. The decoders 7 are intended for decoding groups of bits of the selected microinstruction and issuing basic microorders to be applied to the inputs 8 of the control unit 9. The control unit 9 analyzes these microorders together with the results of preceding operations and produces control signals for the computer data processing unit 16. Control signals are applied from the output 12 of the control unit 9 to the input 14 of the computer data processing unit 16, while data to be analyzed is fed from the output 15 of the unit 16 to the input 13 of the control unit 9. Microinstructions are selected from the basic control data storage 1 by an address whose code is produced by the control unit 4 and applied to the input 2 of the basic control data storage 1. The code of the address of the next microinstruction and those of addresses of the unconditional jumps are applied from the output 3 of the storage 1 to the control unit 4, whereas the branch flags are applied from the output 10 of the control unit 9 to the input 11 of the control unit 4.

The storage 1 is intended for storing only basic control data. During data processing, a signal is applied from the output 55 of the control unit 9 to the input 53 of the flip-flop 52 to set it. A signal from the output of the flip-flop 52 is applied to the inputs 57 of all NOR gates 49 and, from the outputs of the NOR gates 49, passes further to the activate inputs 51 of all the main decoders 7, whereby the decoders 7 are activated. The correctness of data processing by the unit 16 and the validity of the basic control data selected from the storage 1 are checked by the check unit 19. Error signals are applied from the output 17 of the data processing /unit 16 and from the output 21 of the basic control data storage 1 to the inputs 18 and 20 of the check unit 19.

When there is an error, the check unit 19 activates it's diagnostic unit 26 by a signal applied from the output 23 to the input 25 of the diagnostic unit 26. The diagnostic unit 26 produces a number of signals: a signal applied from the output 56 to the input 54 of the flip-flop 52 and resetting the flip-flop and consequently deactivating all the main decoders 7; a signal applied from the output 58 to the input 59 of the basic control data storage 1 discontinuing the selection of data processing microinstructions; and a signal applied from the output 27 to the input 28 of the control unit 29. The control unit 29 produces the codes of the addresses of diagnostic microinstructions, which codes are applied from the output 31 to the input 33 of the diagnostic control data storage 34. The storage 34 stores only diagnostic control data. The flags of conditional jumps and branches are applied, respectively, to the inputs 28 and 30 of the control unit 29 from the output 27 of the diagnostic unit 26 and from the output 32 of the diagnostic control data storage 34. According to the address code transmitted from the control unit 29 to the diagnostic control data storage 34, diagnostic control words (diagnostic microinstructions) are selected in a definite sequence which determines a series of diagnostic procedures.

During diagnostic procedures, the diagnostic control data must ensure;
operation of the diagnostic facilities; and
operation of the main facilities.

To serve the first purpose, a group of bits of a current diagnostic microinstruction is applied from the outputs 35 of the diagnostic control data storage 34 to the additional decoders 36 which generate diagnostic microorders fed to the inputs 37 of the diagnostic unit 26.

To serve the second purpose, the main facilities operate under the control of the same microorders which control these facilities during data processing.

When it becomes necessary that the main facilities should perform a certain action for diagnostic purposes, called from the basic control data storage 1 is any microinstruction containing the microorder determining this action. To this end, the flip-flop 42 is set. A signal from the output of this flip-flop is applied to the inputs 44 of the NAND gates 38 whose other inputs 39 receive address flags from the outputs 40 of the diagnostic control data storage 34. These flags, determining the code of the address of that microinstruction from the basic control data file which contains the microorder required for the execution, are applied from the outputs of the NAND gates 38 to the inputs 41 of the control unit 4. At the same time, the diagnostic unit 26 produces a signal at its output 58, which enables selection from the basic control data storage 1 of the microinstruction by an address whose code is determined by the address flags of the diagnostic microinstruction. Also at the same time, another group of bits of the current diagnostic microinstruction is applied from the outputs 47 of the diagnostic control data storage 34 to the inputs 46 of the NAND gates 45 whose other inputs 48 receive an enable signal from the output of the flip-flop 42. This group of bits contains flags of the microorder of the basic microinstruction which is to be executed. In accordance with these flags, the signal passes via a respective NOR gate 49 to the activate input 51 of that decoder 7 whose data inputs 6 receive, from the selected basic microinstruction, bits containing the required microorder.

The diagnostic unit 26 is activated following a data processing error only if the input 60 receives an enable signal. Without this signal, when a data processing error occurs, the computer either continues processing data or an error halt takes place. The enable signal is either generated by software or entered from the control panel. The error halt mode is set from the control panel. The diagnostic unit 26 may also be activated at any moment during data processing by a software-generated signal applied to the input 61. In addition, the diagnostic unit 26 may be switched over to an off-line mode by a signal arriving from the control panel at the input 61 of the device.

The proposed method and device substantially reduce the diagnostic control data volume. The use of separate store units for basic and diagnostic control data increases the effective storage capacity for storing diagnostic control data. This advantage is achieved by:

using separate store units for basic and diagnostic control data;

using, for diagnostic purposes, microorders contained in basic microinstructions;

using, in diagnostic microinstructions, flags of basic microinstructions instead of main facilities control microorders; and rational coding of diagnostic microorders and basic microinstruction flags in diagnostic microinstructions.

During diagnosis, any microorder can be executed, which permits the formation of any combination thereof and the execution of them in any sequence, thereby substantially extending the functional possibilities of the device. All this permits a malfunction to be located quickly and accurately, using few diagnostic facilities. Besides, this permits automatic off-line microprogrammed diagnosis of computers.

What is claimed is:

1. A device for diagnosing microprogrammed computers, comprising:
a basic control data storage having a first input, a second input, a first output, a second output, and a group of outputs;
a first control unit having a first input, a group of inputs, a second input, and an output, said first input and said output being connected, respectively, to said first output and said first input of said basic control data storage;

first decoders, each having a group of data inputs, an activate input and an output, said data inputs being connected to respective outputs of said group of outputs of said basic control data storage, the number of said first decoders being equal to the number of microorders executed within a machine cycle;

a second control unit having a group of inputs, an input, a first output, a second output, and a third output, said group of inputs being connected to said output of a respective first decoder, and said first output being connected to said second input of said first control unit;

a processing unit, for processing data of said computer, having an input, a first output, and a second output, said input and said first output being connected respectively to said second output and to said input of said second control unit;

a check unit having a first input, a second input, a third input, and an output, said first and second inputs being connected, respectively, to said second output of said processing unit and to said second output of said basic control data storage;

a diagnostic unit having an input, a group of inputs, an enabling input receiving a signal enabling operation of said diagnostic unit following an error signal arriving from said output of said check unit, an activating input receiving a signal activating said diagnostic unit at any moment, a first output, a second output, a third output, a fourth output, and a fifth output, said input and said first output being connected, respectively, to said output and to said third input of said check unit, and said fifth output being connected to said second input of said basic control data storage so that a signal arriving from said diagnostic unit at said storage discontinues the selection of basic control words from said basic control data storage;

a third control unit having a first input, a second input, and an output, said first input being connected to said second output of said diagnostic unit;

a diagnostic control data storage having an input, an output, a first group of outputs, a second group of outputs, and a third group of outputs, said input and said output being connected, respectively, to said output and said second input of said third control unit;

second decoders, each having an input and an output, said input being connected to a respective output of said first group of outputs of said diagnostic control data storage, and said output being connected to a respective input of said group of inputs of said diagnostic unit, the number of said second decoders being equal to the number of the diagnostic microorders executed within an operation cycle of said diagnostic unit;

a first group of NAND gates, each having a first input, a second input, and an output, said first input being connected to a respective output of said second group of outputs of said diagnostic control data storage, and said output being connected to a respective input of said group of inputs of said first control unit;

a first flip-flop having an input and an output, said input being connected to said third output of said diagnostic unit and said output being connected to said second input of each of said NAND gates so that the address flags of an individual basic control word of said basic control data are applied from said diagnostic control data storage, in the presence of an enable signal from said output of said first flip-flop, to said first control unit;

a second group of NAND gates, each having a first input, a second input, and an output, said first input being connected to a respective output of said third group of outputs of said diagnostic control data storage, and said second input of each of said NAND gates being connected to said output of said first flip-flop;

a group of NOR gates, each having a first input, a second input, and an output, said first input being connected to said output of a respective NAND gate of the second group of NAND gates, and said output being connected to said activate input of a respective first decoder so that the flags of the basic microorder contained in said selected basic control word and providing for execution of a predetermined diagnostic procedure are applied via said NAND gates of the second group, in the presence of an enable signal from said output of said first flip-flop, and via said NOR gates to a respective first decoder, thereby activating execution of a predetermined basic microorder;

a second flip-flop having a first input, a second input, and an output, said second input being connected to said fourth output of said diagnostic unit, said first input being connected to said third output of said second control unit, and said output being connected to said second input of each of said NOR gates so that following the arrival, from said third output of said second control unit, of a signal to set said second flip-flop, the second flip-flop produces a signal which passes via said NOR gates to said activate input of each of said first decoders, the arrival of a signal from said fourth output of said diagnostic unit resetting said second flip-flip so that all of said first decoders are deactivated.

* * * * *